United States Patent [19]
Hoff

[11] Patent Number: 5,166,973
[45] Date of Patent: Nov. 24, 1992

[54] RADIO PAGING SYSTEM WITH LOCAL LOCAL LOOP

[75] Inventor: Don G. Hoff, Tiburon, Calif.

[73] Assignees: Seiko Corp.; Seiko Epson Corp., both of Japan

[21] Appl. No.: 489,432

[22] Filed: Mar. 6, 1990

[51] Int. Cl.⁵ ........................................... H04M 11/00
[52] U.S. Cl. ...................................... 379/57; 379/56; 379/170
[58] Field of Search ................................... 379/56-59, 379/61, 63, 201, 214, 170; 340/825.44

[56] References Cited

U.S. PATENT DOCUMENTS

| | | | |
|---|---|---|---|
| 4,644,347 | 2/1987 | Lucas et al. | 379/57 |
| 4,675,863 | 6/1987 | Paneth et al. | 379/59 |
| 4,775,999 | 10/1988 | Williams | 379/57 |
| 4,813,070 | 3/1989 | Homphreys et al. | 379/214 |
| 4,821,308 | 4/1989 | Hashimoto | 379/57 |
| 4,942,598 | 7/1990 | Davis | 379/57 |

FOREIGN PATENT DOCUMENTS

| | | | |
|---|---|---|---|
| 0040954 | 12/1981 | European Pat. Off. | 379/57 |
| 2358065 | 2/1978 | France | 379/170 |
| 0186056 | 8/1986 | Japan | 379/57 |
| 0103526 | 5/1988 | Japan | 379/57 |
| 0246947 | 10/1989 | Japan | 379/170 |

Primary Examiner—James L. Dwyer
Assistant Examiner—Dwayne D. Bost
Attorney, Agent, or Firm—Elmer Galbi

[57] ABSTRACT

A local telephone/radio paging system includes a local paging system, a telephone, and a memory for indicating which telephone numbers are within the local area. When a telephone number is dialed, if the person dialed does not answer, the telephone switching equipment checks the memory to determine whether the dialed number is within the local paging area. If so, a local paging transmitter is activated, paging the person assigned to the unanswered phone. Such a paging transmitter may be included in each phone, or a single central local transmitter may be employed. The paging receivers desirably include alphanumeric displays and indicate the number of the telephone that originated the unanswered call, so that the person carrying the paging receiver may call back immediately.

3 Claims, 3 Drawing Sheets

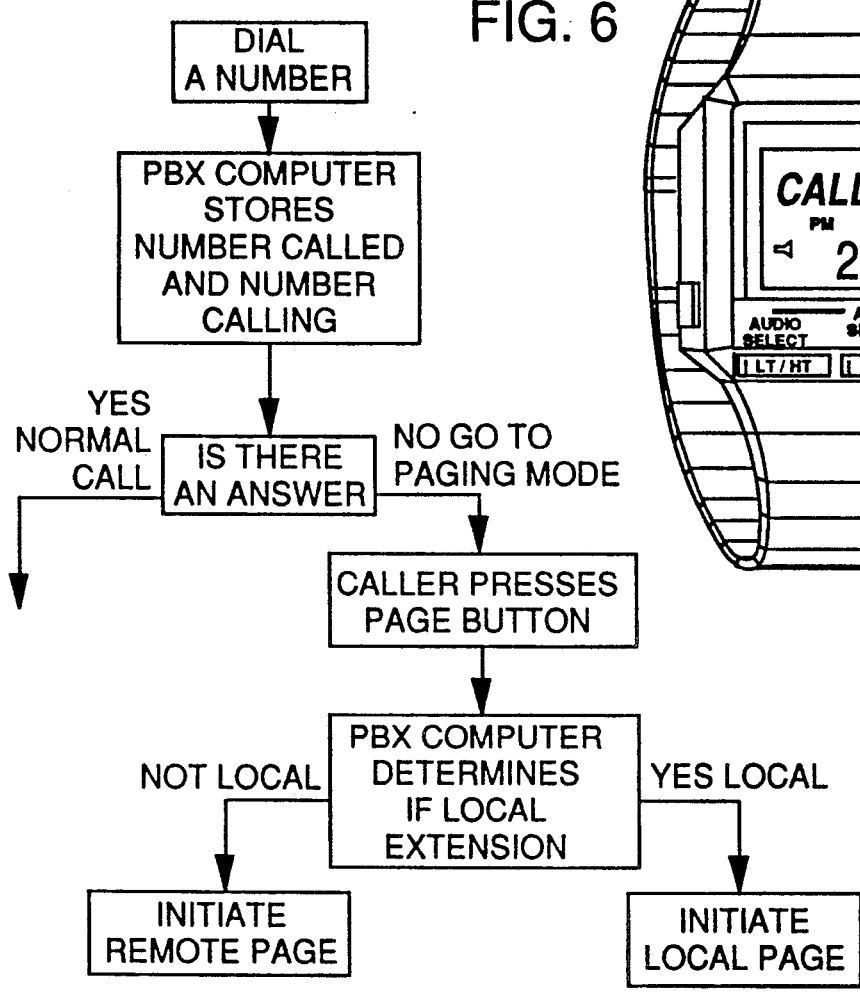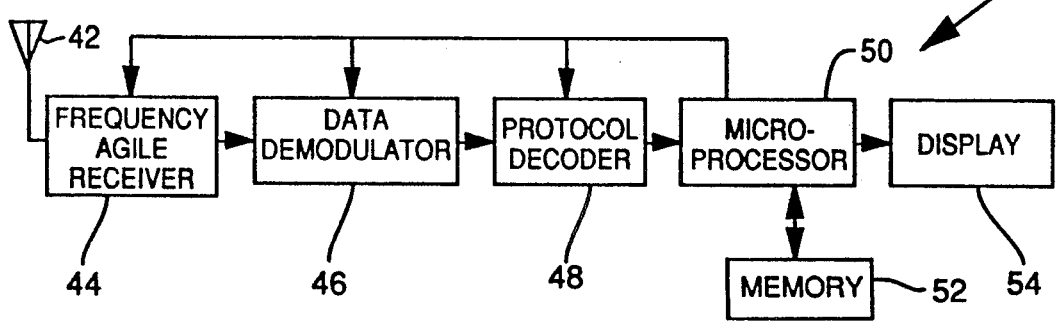

RADIO PAGING SYSTEM WITH LOCAL LOCAL LOOP

FIELD OF THE INVENTION

The present invention relates to telephone systems, and more particularly it relates to the integration of a telephone system with local and remote paging systems.

BACKGROUND OF THE INVENTION

Radio paging systems are generally used to contact a user when the user can not be reached by telephone. Such radio paging technology is well developed. For example see U.S. Pat. No. 4,713,808 (Gaskill).

Systems such as that shown in the above referenced patent can be used to provide both local and remote or wide area paging. Wide area paging systems generally include a computerized system that directs a page to the area where a user previously indicated that he could be found.

Telephone systems are used as an input to radio paging systems; however, despite the relative maturity of the radio, telephone and paging technologies, no presently available system has fully exploited the advantageous and capabilities that may be achieved by using radio, paging and telephone technologies in combination.

SUMMARY OF THE INVENTION

The present invention provides a paging-telephone that includes a paging transmitter. The paging-telephone is connected to a local telephone switch that performs the normal telephone switching functions and which also stores the pager identification of the user associated with each telephone served by that local switch. Naturally some phones may be recorded as not having a designated user.

The paging transmitters in the telephones associated with a local switch constitute a local-local loop. When a telephone number is dialed, if the person called does not answer, the local telephone switch checks its memory to determine whether the dialed number is one of the numbers served by that switch. If it is, the local transmitters in the area are activated to page the user of the unanswered phone. If the person is not served by the local switch, the system can send a page request to the conventional paging system.

Local paging transmitters may be included in each phone, or a single local transmitter may cover an entire building or a specified local area. However, the important aspect of the invention is that paging over the local-local loop takes place without a call being placed throught the normal telephone network to the normal paging clearinghouse.

The paging operation may be instituted automatically by the telephone switching equipment after a certain number of unanswered rings, or may be instituted by the caller by pressing a certain button or button sequence on the originating phone.

The foregoing and additional features and advantages of the present invention will be more readily apparent from the following detailed description, which proceeds with reference to the accompanying drawings.

BRIEF DESCRIPTION OF THE DRAWINGS

FIG. 4; is a flow chart illustrating a sequence of steps employed in the system of FIG. 1.

FIG. 5 is a schematic block diagram of a paging receiver used in the embodiment of FIG. 1.

FIG. 6 shows the external appearance of the receiver of FIG. 5.

DETAILED DESCRIPTION OF A PREFERRED EMBODIMENT

The present invention is illustrated herein with reference to a paging system (the "Gaskill" system) described in U.S. Pat. No. 4,713,808 and in allowed application Ser. No. 07/352,635. The equipment described in these references may be used in both the local and remote paging systems employed in the present invention. It will be recognized, however, that the invention may be practiced with a variety of other paging systems.

Figure 1:
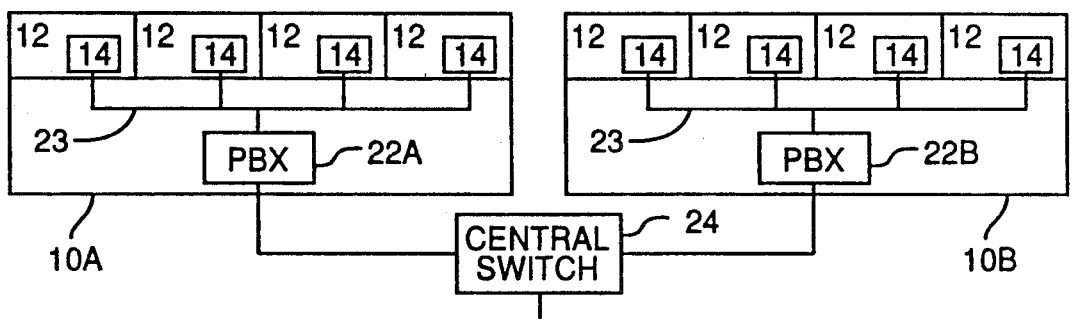
FIG. 1 is a diagram of a local telephone paging system according to one embodiment of the present invention.

FIG. 1 is a diagram showing the layout of two buildings, 10A, 10B. Each of the buildings is divided into a plurality of rooms 12. Each room, in turn, has a telephone 14.

Figure 2:
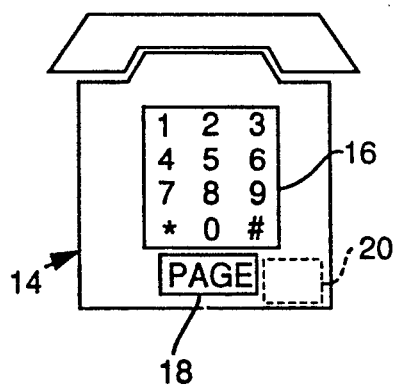
FIG. 2 is a diagram of a telephone used with the system of FIG. 1.

A telephone 14 that ray be used with the present invention is shown in FIG. 2. As can be seen, the telephone includes a conventional tone pad 16, an additional "Page" button 18, and a short range ("local") radio paging transmitter 20 described in greater detail below.

Figure 3:
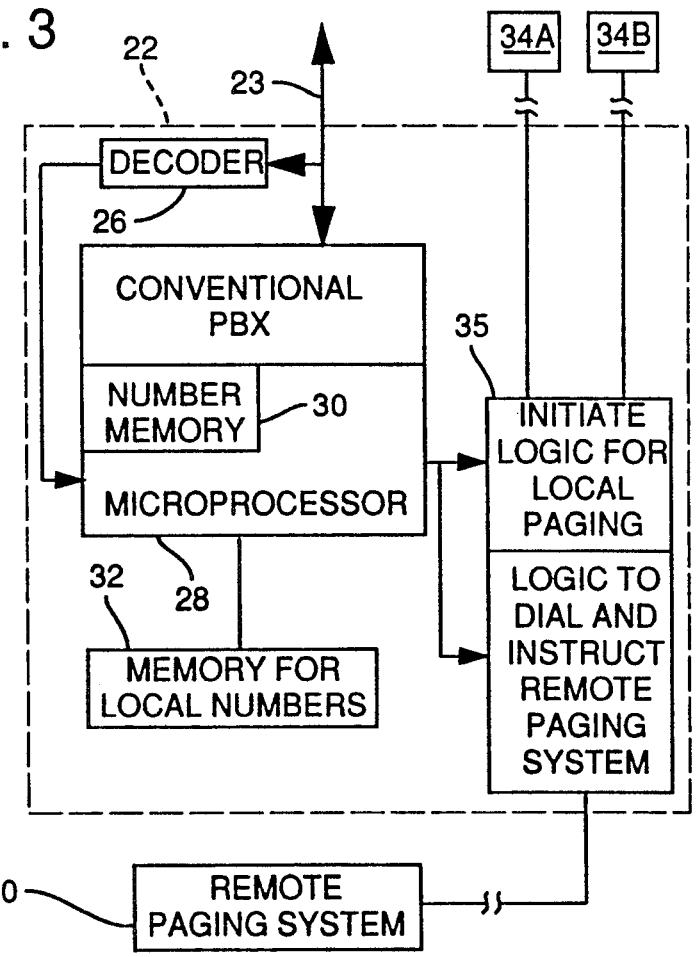
FIG. 3 is a block diagram of a PBX used with the system of FIG. 1.

The telephones in each building are connected to a PBX 22A, 22B for building 10B by wires 23. The PBXs 22A, 22B are connected to a central switching-system 24. Each of the PBXs 22A, 22B (FIG. 3) is a conventional PBX with certain added features, as detailed below. One of these features is a decoder circuit 26 that detects operation of the Page buttons 18 on the PBX's phones.

As is conventional, when a number is dialed by any telephone 14 connected to one of PBXs 22A, 22B, a microprocessor 28 in the PBX stores the originating number and the number which was dialed in a memory 30. According to one aspect of the present invention, if the number dialed does not answer, the person making the call has the option of terminating the call or pressing the Page button 18 on his telephone. If he pushes the Page button, the decoder circuit 26 in the PBX activates a paging routine in the microprocessor 28.

As shown in FIG. 4, this paging routine first compares the dialed number to numbers stored in another memory 32. These stored numbers correspond to telephones that are located in a local geographic region, such as an industrial site served by the telephone system. By comparing the dialed number with these stored numbers, the microprocessor 28 can determine whether the dialed telephone is in the local area.

If the dialed number is in the local area, the PBX causes one or more of the low power paging transmitters 20 in telephones 14 to activate and page the person assigned to the unanswered phone. In the illustrated embodiment, transmitters in both buildings are activated. This activation operation is performed by circuits 34A and 34B which are located in buildings 10A and 10B, respectively (and are coupled to telephones in these buildings respectively), but are each connected to both PBXs 22A and 22B. The transmitter activation circuits 34 operate in conjunction with logic circuitry 35 in the PBXs to which they are connected.

If a local page is issued, the PBX's microprocessor 28 provides the local paging transmitter(s) 20 with the number of the dialed telephone and the number of the originating telephone. The dialed number is used to identify the person to be paged. The transmitter broadcasts a paging signal addressed just to that person so that other pagers will not be activated. The originating number is encoded in data sent with the page and is displayed on the targeted paging receiver 36 to indicate the number to which a call should be returned.

If the microprocessor determines, by comparison of the dialed number with the numbers stored in its memory 32, that the number dialed is not local, the PBX may instruct its auxiliary logic circuitry 35 to dial a remote paging service 40 and to instruct the service to issue a wide area page to locate the dialed person. Again, the number of the originating telephone is included in the paging data so that it may be displayed on the targeted receiver.

FIG. 5 shows a schematic block diagram of a paging receiver 36 used with the present invention. The receiver includes an antenna 42, a frequency agile receiver 44, a data demodulator 46, a protocol decoder 48, a microprocessor 50 (with associated memory 52) and a display 54, as further detailed in the above-referenced Gaskill patent and allowed application. FIG. 6 shows the external appearance of the paging receiver 36.

The Gaskill paging system relies on precise synchronization between the paging transmitters and receivers to insure proper operation. In the present invention, the local paging transmitter(s) 20 should similarly be synchronized to the remote paging system 40 with which they are associated. This can be achieved by providing in association with each transmitter 20 a receiver 56 (FIG. 7) that receives the paging and synchronization signals from the remote paging system 40. By receiving the packet transmissions of the remote paging system, the local transmitter(s) 20 can be precisely synchronized with its operation.

The local transmitter transmits a message to the targeted paging receiver (and timeslot) by gating a low power transmitter on during the time of the second previous packet and for the duration of the targeted packet. The transmission lasts for 40 milliseconds or so. The precise duration is dependent on the time interval during which the receiver is expected to be turned on.

Figure 7:
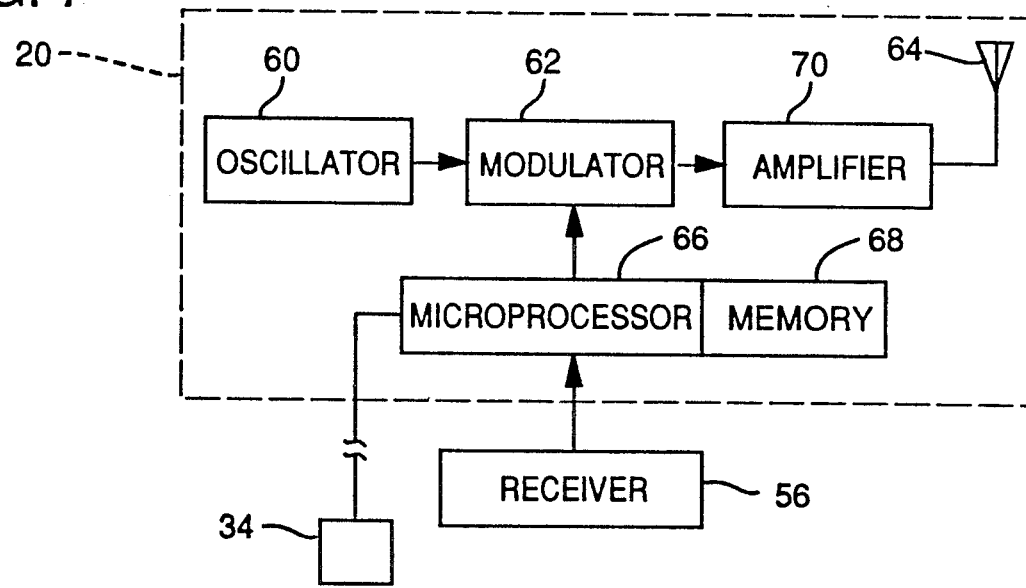
FIG. 7 is a schematic block diagram of a local transmitter used in the embodiment of FIG. 1.

FIG. 7 is a schematic block diagram of a representative local transmitter 20. The transmitter includes an oscillator 60, a modulator 62, a low power amplifier 70, an antenna 64, and a microprocessor 66 (with associated memory 68). The oscillator 60 generates a signal at the desired transmission frequency. It may include one or more multipliers to produce the desired frequency (typically 88-108 Mhz) from a lower frequency fundamental signal (as from a quartz crystal, for example). The modulator 62 modulates the signal produced by the oscillator 60 to produce subcarrier sidebands extending from approximately 54 to 75 Khz away from the carrier, as used in the Gaskill system. The microprocessor 66 provides paging data (i.e. the identity of the person to be paged, and the number to which that person should return a call) to the modulator 62. The microprocessor formats this data into the proper packet format and times it with the required offset, based on the synchronization signals received from the associated receiver 56. These formatting and timing operations are performed in accordance with data and instructions stored in the microprocessor memory 68. The resulting modulated carrier is amplified by the amplifier 70 and broadcast using the antenna 64.

The targeted paging receiver is desirably programmed with the frequency and the time offset of the local transmitter 20 through data contained in packets broadcast periodically by the remote paging system 40. (The local transmitter 20 operates on a different frequency than the remote paging system and the receiver 36 is tuned to listen on this alternate frequency periodically.)

Alternative Embodiments

In one alternative embodiment of the invention, the telephones 14 need not be provided with Page buttons 18. Instead, the PBX microprocessor 28 can be programmed to automatically institute the paging procedure after the dialed phone has rung a certain number of times without an answer.

In another embodiment of the invention, a person who is away from his usual phone may instruct the PBX, by tone commands, of the building in which he can be located. With this information, the PBX can activate only the local paging transmitter(s) 20 serving that one particular building, instead of paging throughout a large industrial site.

From the foregoing, it will be recognized that the present invention has a number of advantages. One is the increased efficiency and speed with which communications may be established between two persons when the person sought is not at the usual telephone. Another is the more efficient use of the conventional remote paging system 40. Such paging systems typically serve geographic areas spanning hundreds or thousands of square miles. The present invention does not invoke this resource unless the person cannot be reached within the local region. A still further advantage is that the PBX keeps track of the numbers of the originating and dialed telephones. When local paging is desired, the caller need only press one button, saving considerable time and effort compared to the conventional process of calling a remote paging system and providing all this data by tone entry.

Having described and illustrated the principles of my invention with reference to a preferred embodiment and several variations thereon, it should be apparent that the invention can be modified in arrangement and detail without departing from such principles. Accordingly, I claim as my invention all such modifications as may come within the scope and spirit of the following claims and equivalents thereto.

I claim:

1. In a telephone system which includes a large number of telephones, each of which has a number assigned thereto; a local PBX; and means connecting a first group of said telephones to said system through said local PBX, the combination of:
   a remote radio paging system serving a first geographical area;
   a local radio paging system serving a second geographical area smaller than said first geographical area, said second geographical area encompassing the area where said first group of telephones are located;

a local radio paging transmitter in each of the telephones in said first group of telephones, said local radio paging transmitters being connected as part of said local radio paging system, manually operable means on telephones in said second geographical area for indicating that radio paging is desired if a numbers is dialed and no answer is received from the associated telephone, means for monitoring numbers dialed by said telephones in said second geographical area for determining whether said numbers corresponds to a telephone within the second geographical area and for activating said local radio paging system if said manually operable means is operated and said dialed number is in said second geographical area and for activating said remote radio paging system if said number is not in said second geographical area;

said manually operable means including a radio Page button on an originating telephone which is operable to indicate that radio paging is desired if a telephone is called and the telephone does not answer, and radio paging receivers for receiving signals from both the remote and local paging systems.

2. In a private branch exchange telephone system that includes a plurality of originating telephones in a particular geographical area and, means for logging the number of an originating phone and a number dialed by said phone, the combination of:

a local radio paging system covering said particular geographical area, said local radio paging system having a radio paging receiver corresponding to each of said telephones in said particular geographical area and a plurality of local transmitters associated with the telephones connected to said private branch exchange, a page button on each of said originating telephones for indicating that radio paging is desired if a telephone is called and there is no answer, first means for determining whether the number dialed is located within said particular geographical area;

second means responsive to said radio page button and to said first means for providing data corresponding to the numbers of the originating and dialed phones to said local radio paging system; and means for activating said local radio paging system to send said number of said originating phone to the paging receiver corresponding to said called telephone.

3. In a private branch exchange telephone system that includes a plurality of originating telephones and means for logging the number of an originating phone and a number dialed by said phone, an improvement comprising:

a radio page button on each of said originating telephones for indicating that paging is desired if a telephone is called and the telephone does not answer, a local radio paging transmitter associated with each of said originating telephones, said local radio paging transmitters being connected to form a local radio paging network, first means for determining whether the number dialed is located within a predetermined geographical area; and second means responsive to said radio page button and to said first means for providing data corresponding to the numbers of the originating and dialed phones to said local radio paging system, said second means including means for providing data corresponding to the numbers of the originating and dialed phones to the radio paging system in response to an instruction issued from the originating phone, said second means including means for providing data corresponding to the numbers of the originating and dialed phones to said local radio paging system in response to activation of said radio page button and to a failure of the dialed phone to answer after a predetermined number of rings.

* * * * *